United States Patent [19]
Lovell

[11] 3,957,937
[45] May 18, 1976

[54] METHOD FOR CURING CONCRETE PRODUCTS

[75] Inventor: Paul W. Lovell, Logan, Iowa

[73] Assignee: Cyclamatic, Inc., Cedar Rapids, Iowa

[22] Filed: Apr. 23, 1974

[21] Appl. No.: 463,320

Related U.S. Application Data

[62] Division of Ser. No. 125,661, March 18, 1971, abandoned.

[52] U.S. Cl. ............................... 264/82; 264/333; 264/DIG. 43
[51] Int. Cl.² ....................................... C04B 15/12
[58] Field of Search .................. 264/82, 333; 23/290

[56] References Cited
UNITED STATES PATENTS

| | | | |
|---|---|---|---|
| 461,888 | 10/1891 | Richardson | 264/DIG. 43 |
| 2,496,895 | 2/1950 | Staley | 264/82 |
| 2,540,354 | 2/1951 | Selden | 264/DIG. 43 |
| 2,575,462 | 11/1951 | Nugey | 264/DIG. 43 |
| 2,932,874 | 4/1960 | Ludwig | 425/432 |
| 3,238,279 | 3/1966 | Tarlton | 264/82 |
| 3,306,961 | 2/1967 | Spence | 264/82 |
| 3,468,993 | 9/1969 | Bierlich | 264/82 |
| 3,492,385 | 1/1970 | Simunic | 264/82 |
| 3,545,733 | 12/1970 | Anderson | 432/64 |

Primary Examiner—Robert F. White
Assistant Examiner—Thomas P. Pavelko
Attorney, Agent, or Firm—Henderson, Strom & Sturm

[57] ABSTRACT

This invention relates to a method for curing concrete products.

The method comprises the steps of subjecting the products to be cured to a steam of a given temperature to produce partial hydration of the products, then subjecting the products to steam of a different temperature, and finally subjecting the products to cooled air, all for predetermined periods of time.

5 Claims, 10 Drawing Figures

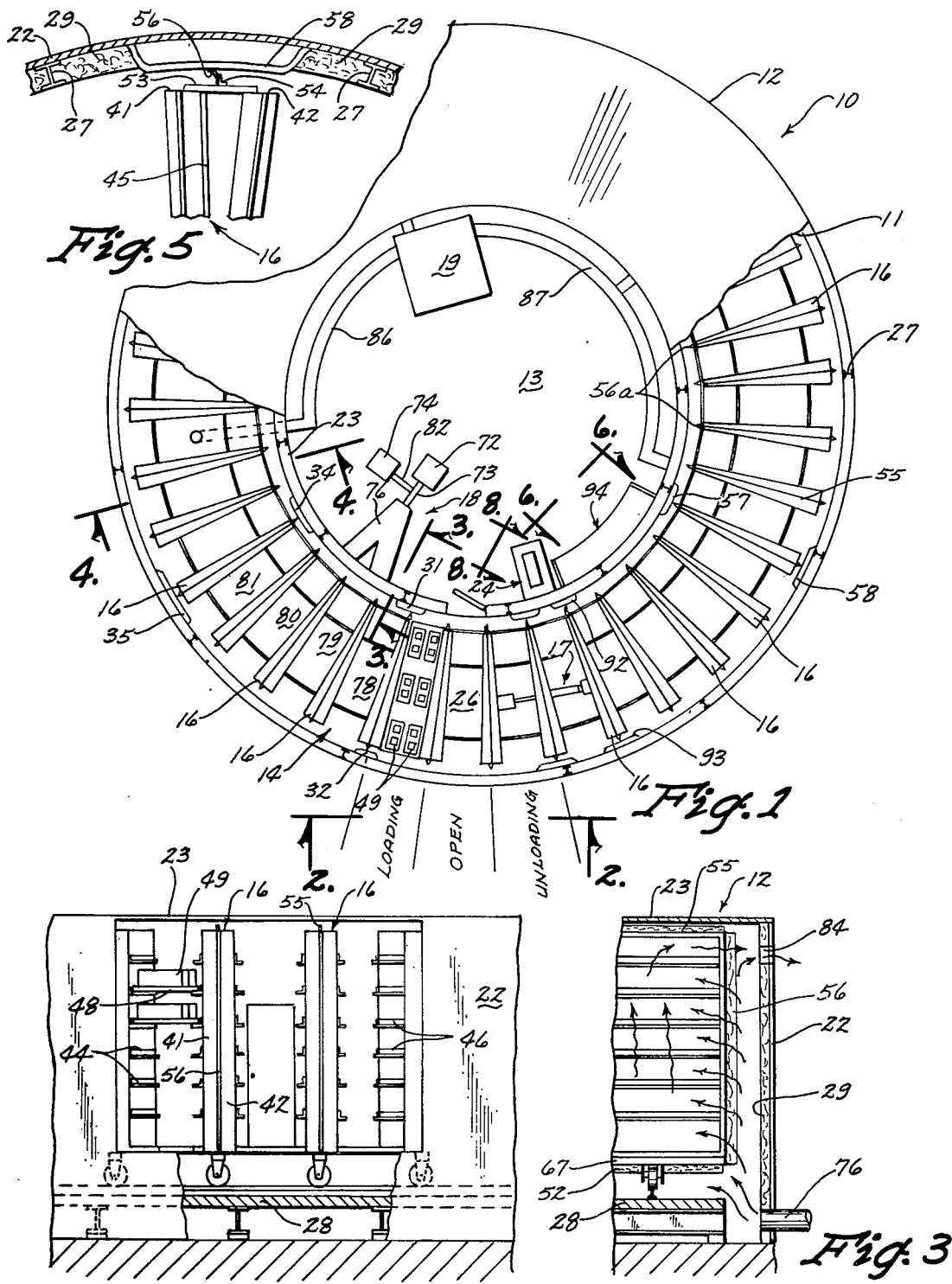

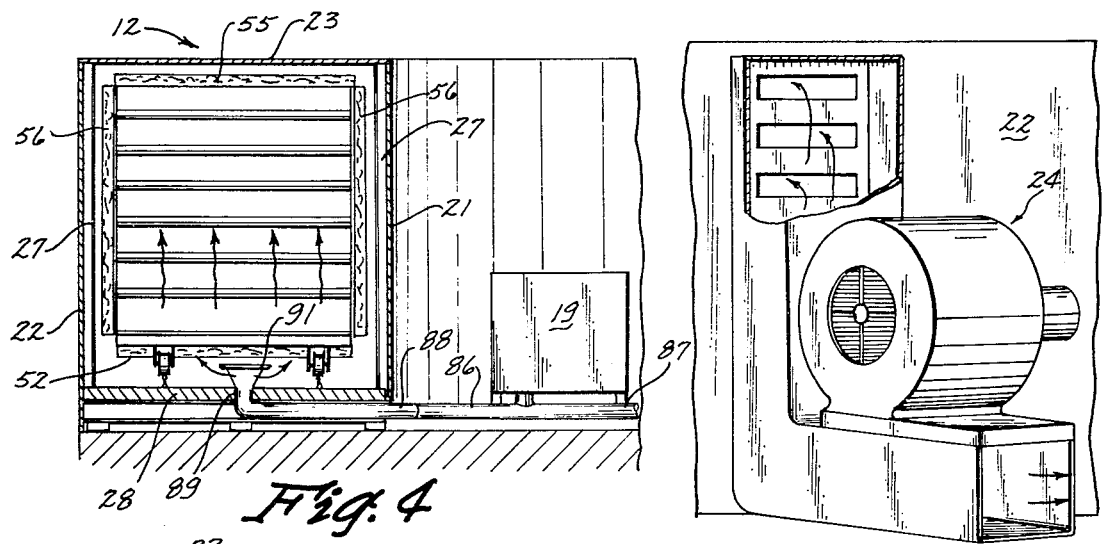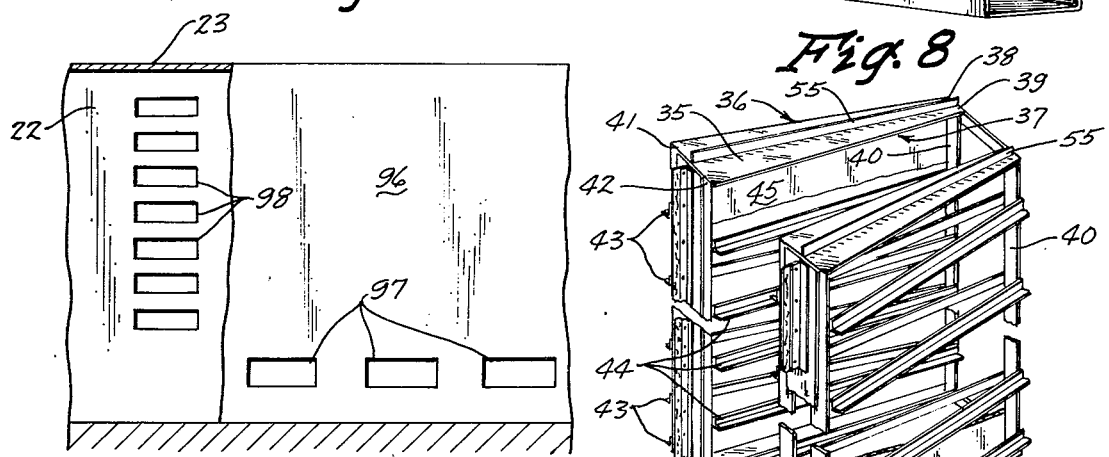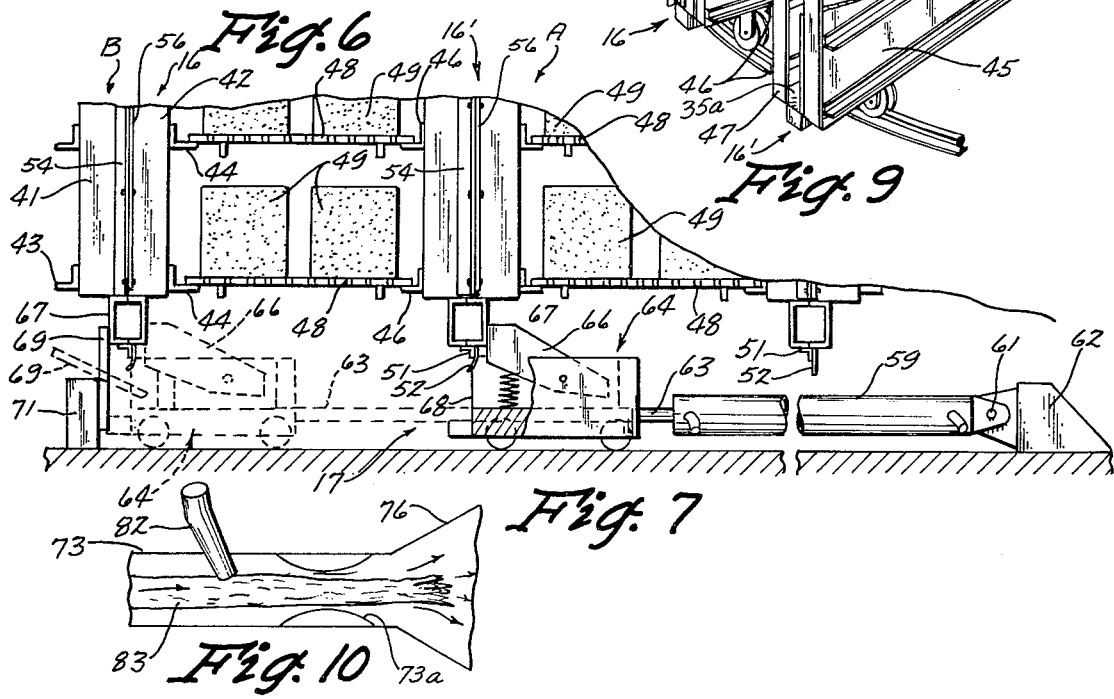

3,957,937

METHOD FOR CURING CONCRETE PRODUCTS

RELATED APPLICATIONS

This is a divisional application of Ser. Nos. 125,661 filed Mar. 18, 1971, and now abandoned.

BACKGROUND OF THE INVENTION

Three known methods of curing concrete products are first, using a steam ambient, second, using a carbon dioxide atmosphere, and third, using an autoclave process.

In the first method, a time period of several hours of steam curing plus 28 days of standard atmospheric conditions are required for hydration to be completed. The second method stimulates the curing process as to the amount of time involved, but the blocks take on a dark cast from the $CO_2$ and still require 28 days of atmospheric curing. The third method, subjecting the products of steam at high pressures, does decrease the amount of curing time to a more satisfactory figure, but involves a considerable more expenditure of monies as compared to the other two methods. Furthermore, the quality of the product is questioned as to the autoclave method.

SUMMARY OF THE INVENTION

The method of this invention comprises a loading stage where a number of the products are loaded at one station into an enclosure in a carosel-type machine; with the enclosure rotated to another station separated from the first and other stations, where the products are subjected to superheated steam and $CO_2$, while at the same time another enclosure is being loaded with another group of products. Subsequently, the first enclosure is rotated to a third station where a curing process occurs, the products being subjected to steam, and with the second and third enclosures being rotated to the first and second stations. Then the first enclosure is rotated to a fourth station where the products are subject to ambient air, and then to a fifth station where cooling air is directed to the products, again with the following successive enclosures each moved to the next station. Finally, the first enclosure is moved to a sixth station where the products are unloaded, the next station being the first, loading station.

One structure for accomplishing this method comprises a circular housing forming an endless tunnel; a plurality of interconnected, spaced rack sections movably mounted in said tunnel forming a plurality of enclosures therebetween and within which products can be inserted for curing; a series of seals formed within the tunnel and on each rack section for coaction at strategically placed locations so as to form the stations of a certain size to accommodate one or more enclosures; a rack section moving apparatus for indexing the enclosures around through the tunnel; apparatus for subjecting the products to superheated steam; apparatus for subjecting the products to steam; and apparatus for cooling the products prior to their being unloaded.

It is an object of this invention to provide an improved method of curing concrete products which is faster than known steam methods, simpler and more economical of equipment as compared to the autoclave process, and which produces a quality product.

These and other objects and advantages of this invention will become readily apparent from the following description when taken in conjunction with the accompanying drawings.

BRIEF DESCRIPTION OF THE DRAWINGS

FIG. 1 is a plan view of a curing machine of this invention, with the roof partially broken away;

FIG. 2 is a fragmentary elevational view of the machine taken along the line 2—2 in FIG. 1;

FIG. 3 is a vertical, fragmentary sectional view taken along the lines 3—3 in FIG. 1;

FIG. 4 is a vertical sectional view taken along the lines 4—4 in FIG. 1;

FIG. 5 is an enlarged view of a detail of FIG. 1;

FIG. 6 is a fragmentary elevational view taken along the line 6—6 in FIG. 1;

FIG. 7 is an enlarged vertical sectional view showing the indexing apparatus;

FIG. 8 is an elevational view of the cooling apparatus, parts broken away for clarity of illustration;

FIG. 9 is an enlarged perspective view of a rack section; and

FIG. 10 is a schematic illustration of the superheated steam formation.

DESCRIPTION OF THE PREFERRED EMBODIMENT

A preferred embodiment of the invention is shown herein, the curing machine being indicated generally at 10 in FIG. 1. It comprises generally an endless tunnel 11 formed by a circular housing 12 generally square in vertical cross section (See FIG. 4), and forming thereby a central area 13 for the placement of various machinery; a product transporting assembly indicated generally at 14 in FIG. 1 and comprising a plurality of interconnected rack sections 16 each of which is identical; and an indexing apparatus 17 for moving the rack sections 16 about the tunnel 11 one position at a time.

As indicated in FIG. 1, a first station is provided for loading products by any known means into an area between a pair of rack sections 16. Moving clockwise, a second station is provided encompassing a next group of areas formed by rack sections into which superheated steam is transmitted by an apparatus 18 installed within the central area 13. Beyond that is a third station for curing formed by a much larger group of areas again formed by the wall sections 16 and into which steam is transmitted by an apparatus 19 in the area 13.

To separate the stations, one from another, seal devices described in detail hereinafter, are mounted about the perimeter of each rack section 16 and cooperate with the interior wall, ceiling and floor surfaces of the tunnel 11 to completely seal off one side of a rack section 16 from the other side thereof. The vertical seal devices coact with vertical seal devices, also described hereinafter, on the tunnel walls to obtain maximum sealing.

A fourth station for holding purposes is found clockwise from and adjacent to the third station, as illustrated in FIG. 1; and next to the fourth station is a fifth station where cooling of the products occurs, cool air being directed into the tunnel at that location by a blower apparatus 24. Identical to the first, loading station is a sixth unloading station where the cured products are unloaded from the machine 10 by any known means. Between the sixth and first stations is an open area formed in both the walls 21 and 22 such that a passageway 26 is formed when rack sections 16 are on either side thereof, such that a person can walk through the passageway 26 from the outside of the machine 10 to the inner area 13.

More specifically, the tunnel includes vertical side walls 21 and 22, and the ceiling 23 to form the skin of the tunnel. A floor 28 (FIG. 4) is secured to the bottom of the frames 27 and is flat except as described in detail hereinafter. Intermediate the box frames 27 is an insulation 29 for aid in maintaining the temperatures within the various stations.

To form the second station as air tight as possible, a pair of opposed shoulder members 31 and 32 (FIG. 1, and See FIG. 5) are secured to the interiors of the inner wall 21 and the outer wall 22, respectively, in an upright manner, each member 31 having a height at least that of each rack section 16. These members 31 and 32 separate the first station area from the second station area, with the latter station completed by another pair of shoulder members 34 and 35 (FIG. 1).

As the rack sections 16 (FIGS. 1 and 9) making up the product transporting assembly 14 are identical, only one will be described. The rack section 16 comprises a V-shaped pair of identical upright parallel frames 36 and 37 joined in slight spaced relation at their inner ends 38, 39 and at their outer ends 41, 42. Each frame 36 and 37 includes a V-shaped, flat top plate 35, and an identical bottom plate 35a, these plates joined in the front by a pair of vertically disposed channel irons 41 and 42, and at the rear by another channel iron 40. These members are interconnected by a flat plate 45 (FIG. 9) which forms an interior wall for each rack section 16.

Secured to the vertical members 41 and 40 in vertically spaced relation are a plurality of horizontally disposed, elongated angle irons 43 (FIG. 9), and to the vertical members 42 and 40, another set of angle irons 44, with each angle iron being on the same horizontal level as its opposite, and facing oppositely such that the angle irons 44, for example, of the frame 37 and the angle irons 46 of adjacent frame 47 of the next rack section 16' form lateral supports between the two adjacent rack sections 16 and 16' for a pallet 48 (FIG. 7) to be inserted thereon. Upon the pallet are placed the concrete products 49 to be cured.

It can readily be appreciated, that depending upon the number of opposed pairs of angle irons, the same number of pallets can be inserted (See FIG. 2), and upon the pallets, as many concrete products as will fit into the spaces formed between the pallets and the wall sections can be inserted.

On the underside of each bottom plate 35a, an angle iron 51 (FIGS. 4 and 7) is secured and to which is connected an elongated strip 52 of rubber, leather or the like for providing a bottom seal where necessary. The side seals of the wall sections 16 are completed by a vertical plate 53 (FIG. 5) being secured to and extended between the outer ends 41, 42 of each wall section 16, and with a vertical angle iron 54 secured thereto supporting a vertical, elongated strip 56 of rubber, leather or the like. The same arrangement provides a seal 56a along the inner iron 40, and also a seal 55 along the upper plate 35. Referring to FIG. 5, it can easily be seen that when the rack section 16 is halted at the location of the shoulder 58, opposite inner shoulder member 57 (FIG. 1), the cooperation of the strip 56 with the shoulder 58 creates a seal to aid in separating the respective areas on either side of the particular wall section located between an opposed inner and outer pair of shoulder members, as 57 and 58 in FIG. 1.

The seal at each pair of shoulders 31, 32, 35 etc. is aided by raising the floor 28 therebetween, and lowering the ceiling 23 therebetween, so that all four seals 55, 56, 56a and 52 are operative whenever a rack section 16 is disposed between any pair of shoulders.

Referring to FIGS. 1 and 7, the indexing apparatus 17 for moving the carosel-type assembly 14 about and through the tunnel 11 is illustrated. This includes a hydraulically operated, conventional cylinder 59 pivotally connected at 61 to a block 62, and form which a piston 63 extends for connection to a movable cart 64. The cart 64 has a pusher arm 66 pivotally connected thereto, spring biased upwardly for engagement with a bottom member 67 of the frame of each rack section 16.

The cart 64 has a normal position as shown in full lines in FIG. 7, whereat as the cart has returned from its extended, dotted line position upon the arm 66 engaging the member 67, the former is depressed so as to permit the cart 64 to pass by, the cart halting at that point shown in full lines. Upon actuation of the cylinder 59, the piston 63 pushes the rack section forward, to the left as viewed in FIG. 7, and clockwise as viewed in FIG. 1, until the front 68 of the cart 64 engages a normally vertical plate 69 pivotally connected to a stop block 71. It will be noted at this position, the rack section 16 is held up against the plate 69 by the arm 66. When the cart 64 is returned to its full line position, cocked so to speak to index forward another wall section, when this occurs the plate 69 is pivoted counterclockwise (FIG. 7) to the dotted line position by engagement with the member 67 passing by. The plate 69 then returns to its normally vertical position. In this manner, the entire plurality of interconnected rack sections 16 are rotated as a unit, one section at a time by the indexing apparatus 17.

It may be noted that the location of the stations may be reversed, wherein the direction of indexing could readily be reversed by merely facing the indexing apparatus 17 oppositely. Also of course other types of power may be utilized for the apparatus 17.

For providing superheated steam for the second station, the apparatus 18 (FIG. 1) includes a forced draft gas burner 72 with a capacity of about 400,000 BTU, a throat conduit 73 having a venturi area 73a (FIG. 10), a source 74 of steam, and a V-shaped supply duct 76 which transmits the superheated steam through a pair of openings 77 (FIG. 3) (only one showing) formed in the housing inner wall 21 in front of four enclosures 78, 79, 80 and 81 (FIG. 1) formed by the rack sections 16 between the two arcuately spaced pairs of shoulder members 31, 32 and 34, 35. The tubular conduit 73 has an internal diameter of approximately 6 inches, a length of about 20 inches, and the venturi opening 73a at the outer end thereof is reduced to about 3 inches in diameter and 8 inches in length. The steam from the source 74 is forced through a pipe 82 (FIG. 10) at an angle to the steam throat 73 and is introduced directly into the flame 83 at its base, whereby an extremely fine vapor of superheated steam is introduced into the second station area. At the upper portions of the housing wall 21 in this area, a plurality of slots 84 are formed for permitting the superheated steam to discharge from the station.

The products of this apparatus, called a steam difusifier, must not be directed directly onto the concrete products, but should be allowed to filter about them, thus permitting the $CO_2$ gas to be picked up by the high temperature steam vapor and pulled into the concrete products in a blotter-like method. Thus, hydration is accelerated without leaving chrystalization on the outer surface of the concrete products.

To provide steam in the third station called the curing area, a conventional steam producing apparatus 19 transmits the steam through a pair of supply pipes 86 and 87 (FIG. 1) and to a plurality of lateral pipes 88 (FIG. 4) for directing the steam upwardly through an opening 89 in the floor 28 for each pipe 88. A baffle 91 is mounted above each opening for deflecting the steam about the surrounding area.

The fourth station is merely a holding area formed by the opposite pair of shoulder members 57 and 58, and by another pair of shoulder members 92 and 93 spaced arcuately therefrom such that approximately four enclosures formed by five rack sections 16 are disposable therein. To prevent ambient air from rushing into the holding area, a chamber 94 (FIG. 1) is formed on the inside of the holding area by an additional wall 96 (FIG. 6), and whereby openings 97 are formed along the bottom of the wall 96 with vertically spaced openings 98 formed within the chamber 94 in the housing inner wall 21.

In operation of the curing machine 10, as mentioned hereinbefore, concrete products 49 (FIG. 7) on a plurality of pallets 48 are inserted horizontally in vertical stacked relation on the angle irons such as 44 and 46 within an enclosure formed between a pair of rack sections 16 at the loading station. The loading is accomplished either manually or mechanically by any loading mechanism interposed between the curing machine 10 and the product forming machine (not shown). The machine 10 is usable with conventional ingredients and conventional forming methods, and regardless the type concrete product or the ingredients and method used in forming same, the following operation of the curing machine 10 is applicable.

The loaded enclosure is then moved clockwise as viewed in FIG. 1 into the second station where superheated steam from the apparatus 18 is applied, while another enclosure moved into the loading area by the indexing apparatus 17 is loaded. Within the second station, the temperature is maintained at 175° – 250°F., the relative humidity is 100%, and the temperature of the blocks is raised quite rapidly to permit hydration to accelerate. In one specific example of operation, the loading and unloading of an enclosure was set to enable the indexing apparatus 17 to move an enclosure every 3 minutes. Thus, after 3 minutes, the second enclosure is moved into the second station, with the first enclosure being indexed clockwise one move, and with a third enclosure being moved into the loading area. The method of indexing each enclosure one step or move at a time every 3 minutes around and through the tunnel 11 is believed understandable at this time, and as it is recommended there be 32 enclosures, it would take each enclosure 96 minutes to complete the clockwise movement from loading station to the open station, plus a very nominal time for the indexing apparatus 17 to make each physical move of a rack section 16 from position A of FIG. 7 to position B.

The second station is comprised of an area for encompassing four enclosures, and each group of products in a single enclosure is therefore in the second station a total of 12 minutes. The third station area holds twenty enclosures such that each group of products in a single enclosure is in that area sixty minutes. There, the temperature is maintained at 195° – 200°F. by steam at 212°F. and the relative humidity is 100%.

The fourth station is merely a holding area where the products are subjected only to ambient air, and as it comprises four enclosures, each group of products in an enclosure is in that area twelve minutes. The fifth station is the cooling area and comprises but one enclosure, thus each group of blocks in a single enclosure is in the fifth cooling station 3 minutes. The temperature of the concrete products in that period of time is reduced from approximately 200°F. for unloading purposes. It will be noted that the number of enclosures will vary, depending upon the rate of cycling, still allowing about 1 ½ hours for a complete rotation of each enclosure.

Concrete products, such as conventional blocks having dimensions of 8 × 8 × 16 inches were tested after being cured in the machine 10 according to the aforementioned method, and 2½ hours after removal machine had a compresive strength of 1150 p.s.i. Twenty four hours after removal, their compresive strength was 1700 p.s.i. This test was based upon 26 blocks per bag of high early cement.

The controls, not shown, for operating the curing machine 10 are standard and quite simple. The indexing apparatus 17 is controlled to not operate until and unless both the loading and the unloading operations are completed, and all safety precautions are provided for.

Although the invention has been described as to a particular embodiment, many changes and modifications can be made thereto by those skilled in the art without departing from the true spirit and scope of this invention.

I claim:

1. The method of rapidly curing concrete products in a machine including a circular, endless tunnel having a circular track therein, a plurality of interconnected racks movably mounted upon the track for carrying a plurality of the products to be cured, means for rotating the racks in an indexing manner and in a timed manner hereinafter defined, each rack having a solid divider panel with a peripheral seal for coaction with each of a plurality of seals secured about the interior of the tunnel in arcuately spaced relation to form with each coaction a substantially hermetical sealed wall thereby forming a plurality of continuously formed hermetically sealed stations within the tunnel, the method comprising the steps:

loading at least one of the products onto a first rack at a first station within the tunnel, said first station open to the atmosphere;

moving the first rack to the next adjacent station within the tunnel, said next station being a second station automatically sealed by coaction of the rack seals with the tunnel seals, while repeating the loading action at the first station on a second rack;

introducing a superheated steam and carbon dioxide into the second station and maintaining the temperature within said second station at a range of 175° to 250° F. for approximately 12 minutes;

moving said first rack to a third automatically sealed station adjacent to said second station while simultaneously repeating the action at said previous stations;

introducing a non-superheated steam into the third station and maintaining the temperature therein at a range of 195° to 200° F. for approximately 60 minutes;

moving said first rack to a fourth automatically sealed station adjacent said third station while simultaneously repeating the actions at said previous stations;

exposing the first rack in said fourth station to ambient air from external the tunnel for approximately 12 minutes;

moving said first rack to a fifth automatically sealed station adjacent said fourth station while simultaneously repeating the actions at said previous stations;

forcing ambient air from external the tunnel into said fifth station for approximately 3 minutes;

moving said first rack to a sixth station adjacent said fifth station, said sixth station being exposed to the atmosphere; and unloading the rapidly cured products from the first rack at the sixth station, while simultaneously repeating the actions at said previous stations.

2. The method of claim 1, and further wherein the forced ambient air blown into the fifth sealed station is directed horizontally across the products in the rack therein.

3. The method of claim 1, and further wherein the step of introducing superheated steam and carbon dioxide into the second station comprises directing steam under pressure into a flame and directing the resultant steam of fine vapor into the second station.

4. The method of claim 1, and further wherein the first rack is moved from the unloading station to an area formed in the tunnel intermediate to unloading or loading stations, the area being open to both sides of the tunnel for personnel entry therethrough.

5. The method of claim 3, and further wherein the superheated steam and carbon dioxide introduced into the second station are directed away from direct contact with the products therein.

* * * * *